US011442736B2

(12) United States Patent
Jerolm (10) Patent No.: US 11,442,736 B2
(45) Date of Patent: Sep. 13, 2022

(54) DETERMINATION OF DATA BUS SUBSCRIBERS OF A LOCAL BUS

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 295 days.

(21) Appl. No.: 16/694,585

(22) Filed: Nov. 25, 2019

(65) Prior Publication Data

US 2020/0092134 A1    Mar. 19, 2020

Related U.S. Application Data

(63) Continuation of application No. PCT/EP2018/062951, filed on May 17, 2018.

(30) Foreign Application Priority Data

May 24, 2017    (DE) .................... 10 2017 208 830.3

(51) Int. Cl.
*H04L 12/40*    (2006.01)
*H04L 12/403*    (2006.01)
(Continued)

(52) U.S. Cl.
CPC .......... *G06F 9/3802* (2013.01); *G06F 9/445* (2013.01); *G06F 9/546* (2013.01); *H04L 12/403* (2013.01);
(Continued)

(58) Field of Classification Search
None
See application file for complete search history.

(56) References Cited

U.S. PATENT DOCUMENTS

| 4,881,074 A | 11/1989 | Reichbauer et al. |
| 5,472,347 A | 12/1995 | Nordenstrom et al. |

(Continued)

FOREIGN PATENT DOCUMENTS

| CN | 101196739 A | 6/2008 |
| CN | 102934414 A | 2/2013 |

(Continued)

OTHER PUBLICATIONS

IBM Technical Disclosure Bulletin 'Topographical Addressing on Loops' NN7207380, Jul. 1972. (Year: 1972).*

(Continued)

*Primary Examiner* — Steven G Snyder
(74) *Attorney, Agent, or Firm* — Muncy, Geissler, Olds & Lowe, P.C.

(57) ABSTRACT

A method is described for identifying communication-ready data bus subscribers connected to a local bus. The method comprises receiving, at a local bus master, at least one data packet transmitted via the local bus, wherein the at least one data packet received at the local bus master comprises an address of a communication-ready data bus subscriber among a plurality of communication-ready data bus subscribers in the local bus, wherein the communication-ready data bus subscriber is in a sequence of communication-ready data bus subscribers, and mapping of the received address by the local bus master to a relative position of the communication-ready data bus subscriber in the sequence of communication-ready data bus subscribers in the local bus. In addition, a local bus master of the local bus is described.

18 Claims, 5 Drawing Sheets

(51) Int. Cl.
   *H04L 12/42* (2006.01)
   *H04L 12/423* (2006.01)
   *G06F 9/54* (2006.01)
   *G06F 9/38* (2018.01)
   *G06F 9/445* (2018.01)

(52) U.S. Cl.
   CPC .. *H04L 12/40013* (2013.01); *H04L 12/40019* (2013.01); *H04L 12/42* (2013.01); *H04L 12/422* (2013.01); *H04L 12/423* (2013.01); *H04L 2012/4026* (2013.01)

(56) References Cited

U.S. PATENT DOCUMENTS

| | | | |
|---|---|---|---|
| 5,920,267 | A | 7/1999 | Tattersall et al. |
| 6,700,877 | B1 | 3/2004 | Lorenz et al. |
| 7,933,663 | B2 | 4/2011 | Teranisi et al. |
| 8,260,884 | B2 | 9/2012 | Schmidt |
| 9,274,997 | B2* | 3/2016 | Berenbaum ......... G06F 13/4256 |
| 10,204,072 | B2 | 2/2019 | Schmidt et al. |
| 10,216,678 | B2* | 2/2019 | Murtaza ............. G06F 13/4068 |
| 10,805,262 | B1* | 10/2020 | Fayfield .............. H04L 61/2069 |
| 10,884,451 | B2* | 1/2021 | Lee ...................... H04L 12/422 |
| 2007/0182445 | A1* | 8/2007 | Chen ...................... G06F 30/34 326/39 |
| 2012/0023206 | A1 | 1/2012 | Kusama et al. |
| 2012/0076146 | A1* | 3/2012 | Rohatschek .......... H04L 12/422 370/392 |
| 2013/0148753 | A1 | 6/2013 | Willms |
| 2013/0297829 | A1* | 11/2013 | Berenbaum ......... G06F 13/4256 710/3 |
| 2014/0173345 | A1* | 6/2014 | Gorti ...................... G06F 11/27 714/30 |
| 2016/0098371 | A1* | 4/2016 | Murtaza .............. G06F 13/4282 710/110 |

FOREIGN PATENT DOCUMENTS

| | | | |
|---|---|---|---|
| CN | 103119916 A | 5/2013 | |
| CN | 104253880 A | 12/2014 | |
| DE | 195 45 566 A1 | 6/1997 | |
| DE | 19733906 A1 | 2/1999 | |
| DE | 102008044318 A1 | 8/2009 | |
| EP | 0 290 934 A2 | 11/1988 | |
| EP | 0428810 B1 * | 8/1994 | ............. H04L 12/42 |
| EP | 3151474 B1 * | 9/2018 | ........... H04L 12/403 |
| ER | 0 682 431 A1 | 11/1995 | |
| WO | WO-2005053236 A1 * | 6/2005 | ........... H04L 12/403 |
| WO | WO-2018215290 A1 * | 11/2018 | ....... H04L 12/40019 |

OTHER PUBLICATIONS

'IgH EtherCAT Master 1.5.2 Documentation' by Florian Pose, Oct. 27, 2017. (Year: 2017).*

Chinese Office Action dated Jun. 1, 2021 in corresponding application 201880034550.1.

* cited by examiner

DETERMINATION OF DATA BUS SUBSCRIBERS OF A LOCAL BUS

This nonprovisional application is a continuation of International Application No. PCT/EP2018/062951, which was filed on May 17, 2018, and which claims priority to German Patent Application No. 10 2017 208 830.3, which was filed in Germany on May 24, 2017, and which are both herein incorporated by reference.

BACKGROUND OF THE INVENTION

Field of the Invention

The present invention relates to identifying data bus subscribers of a local bus, in particular identification based on querying the addresses of communication-ready data bus subscribers.

Description of the Background Art

Bus systems and in particular local bus systems have become an indispensable part of today's automation systems. Automation systems are used in particular for controlling industrial plants, buildings and means of transport. Usually, a plurality of sensors and actuators are required in order to control an automation system. These sensors and actuators monitor and control the process that the system carries out. These different sensors and actuators of an automation system are often referred to as automation devices.

These automation devices may either be connected directly to a controller of the automation system, or may first be connected to input and output modules, often referred to as I/O modules. These may in turn be connected directly to the controller. These automation devices may either be integrated directly into the I/O modules or may be connected to them via a wired or wireless connection.

The control of an automation system is usually accomplished using one or more programmable logic controllers (PLCs). The PLCs may be arranged hierarchically or decentrally in an automation system. There are different performance classes for the PLCs, so that they may be subject to different controls and rules depending on the computing and memory capacity. In the simplest case, a PLC has inputs, outputs, an operating system (firmware) and an interface via which a user program may be loaded.

The user program determines how the outputs are switched as a function of the inputs. The inputs and outputs may be connected to the automation devices and/or the I/O modules, and the logic stored in the user program may be used to monitor or control the process that the automation system performs. The sensors provide monitoring of the process and the actuators provide control of the process. The controller may also be referred to as a central controller or central unit and controls at least one automation device or I/O module connected to the controller.

However, directly connecting the automation devices with at least one controller or the I/O modules with at least one controller in the form of parallel wiring, i.e. running a line from each automation device or each I/O module to the higher-level controller, is very time-consuming. Especially with the increasing degree of automation of an automation system, the cabling effort increases in the case of parallel wiring. This involves a great deal of effort in project planning, installation, commissioning and maintenance.

For this reason, typically in contemporary automation technology, bus systems are used that allow connecting the automation devices or the I/O modules to the control system. In order to further simplify the connection of the individual automation devices or I/O modules with the bus system, currently, individual groups of automation devices or I/O modules are often first connected to each other to form a local bus system using a specialized local bus, and then at least one subscriber of this local bus is connected to the bus system that is connected to the controller. In this case, the local bus system may differ from the bus system that is used to establish the connection with the control system.

In a group of local bus subscribers, the subscriber that is connected to the bus system of the controller is often referred to as a local bus master.

Alternatively, the term "head-end station" of the local bus system is also used. In contrast to the other local bus subscribers, this local bus master may contain additional logics, circuits or functionalities that are necessary for connecting to the bus system of the controller. The local bus master itself may also contain a PLC. This subscriber may also have logics and circuits for conversion between the two bus systems. The local bus master accordingly may also be designed as a gateway or bus converter, and ensures that the data available in the format of one bus system is converted into the format of the local bus system and vice versa. Usually, but not necessarily, the local bus master is specialized for connecting the local bus to the higher-level bus.

The local buses that are used are usually adapted to the special usage requirements of the automation devices or I/O modules, or take into account the specific hardware design thereof. In this case, the groups of automation devices or I/O modules of the local bus system usually form a subgroup of the automation system for executing a specific task in the process that the automation system carries out. The data exchanged on the buses for the process is often referred to as local bus data or process data, because this data contains information for regulating or controlling the process that the automation system carries out. This data may comprise, among other things, measurement data, control data, status data and/or other information. Depending on the bus protocol used, this data may be prepended ("header") or appended ("tail") to other data. This other data may contain information regarding the data, or information regarding internal communication on the local bus. In this case, a multiplicity of different information is known that may be prepended or appended to the data depending on the bus protocol used. The local bus subscribers connected to a local bus may also be referred to as data bus subscribers because they exchange data on the local bus. A data bus subscriber may be used to control or monitor a process, in particular by outputting control signals, for example to actuators, and/or by receiving measurement signals, for example from sensors. The data bus subscriber converts the control signals and/or measurement signals into data for the local bus or vice versa.

The data bus subscribers may also be referred to as local bus subscribers.

A ring bus is a specialized form of such a local bus, as is known for example from U.S. Pat. No. 5,472,347 A. In a ring bus, the data bus subscribers, for example the automation devices or I/O modules, are each respectively connected to their directly adjacent data bus subscribers, and data is forwarded in sequence from one data bus subscriber to another. The data transmitted on the local bus may also be referred to as local bus data. Thus, the data is not sent to all data bus subscribers simultaneously, but in sequence, with a data bus subscriber receiving data from its upstream data bus subscriber and forwarding data to its downstream data bus subscriber. Between receiving the data and forwarding it, the data bus subscriber may process the received data. When the data has reached the last data bus subscriber in the sequence, the data from the last data bus subscriber is returned back to the first data bus subscriber. The return may take place via all data bus subscribers or by bypassing them via a bypass line. The ring bus thus has a downstream flow and an upstream flow of data. The data in a ring bus is usually transmitted in the form of data packets that pass through all data bus subscribers.

For sending to specific data bus subscribers, data packets are furnished with an address that corresponds to the data bus subscriber, so that the data bus subscriber with the corresponding address may extract the data from the data packet. For this purpose, however, the addresses of the data bus subscribers must be known in advance. In prior art ring buses, the data bus subscribers are often addressed in the ring bus according to their physical sequence. However, this makes the self-management of the ring bus very inflexible and static, in particular if new data bus subscribers are inserted into the ring bus or old ones are replaced.

SUMMARY OF THE INVENTION

It is therefore an object of the present invention to provide methods and devices in which it is possible to flexibly identify the data bus subscribers when exchanging data bus subscribers or initializing the local bus.

The method according to an exemplary embodiment of the invention for identifying communication-ready data bus subscribers connected to a local bus, in particular a ring bus, comprises receiving, at a local bus master, at least one data packet transmitted via the local bus; the at least one data packet has an address of a communication-ready data bus subscriber from a plurality of communication-ready data bus subscribers in the local bus, and the communication-ready data bus subscriber is in a sequence of communication-ready data bus subscribers. In addition, the method comprises the local bus master mapping the received address to a relative position of the communication-ready data bus subscriber in the sequence of communication-ready data bus subscribers, for example to identify the communication-ready data bus subscribers. Identifying these communication-ready data bus subscribers may comprise knowing the addresses of the communication-ready data bus subscribers. Using the information thus obtained, the local bus master maps the received addresses to an identified communication-ready data bus subscriber. The mapping does not correspond to the physical position of the communication-ready data bus subscribers on the local bus; instead, it corresponds to the relative position of the communication-ready data bus subscribers. In this case, the physical position may be described as the absolute position of the data bus subscribers on the local bus, with the relative position being determined as a function of how the data bus subscribers become communication-ready. Flexible identification is possible by using the relative position of the data bus subscriber, which depends not on the data bus subscriber's physical position, but on its communication readiness. The local bus master may maintain a table of the communication-ready data bus subscribers and their addresses as well as their relative positions.

Each relative position may be mapped to one address of exactly one communication-ready data bus subscriber. This mapping may be updated when a new data bus subscriber is connected to the local bus or when a data bus subscriber is removed. Because relative positions are used, a new data bus subscriber and its address may easily be added to the table, or an address may be removed from the table when a data bus subscriber is removed. By mapping the received address of the data bus subscribers to a relative position, it is also possible for the data bus subscribers to continue using their currently stored address without having to either assign a new address to the data bus subscribers or program the data bus subscriber with the address of the physical position. Re-addressing the data bus subscribers is accordingly only necessary in cases in which there are collisions, i.e. in which a plurality of data bus subscribers use the same address. This serves to ensure that the local bus master may address the communication-ready data bus subscribers very rapidly without lengthy initialization phases for addressing being necessary.

In another preferred embodiment, the method according to the invention additionally comprises, before receiving the at least one data packet, sending the at least one data packet from the local bus master to the local bus to the communication-ready data bus subscriber for querying the address of at least one of the communication-ready data bus subscribers so that this address may be mapped to the relative position of the communication-ready data bus subscriber. In other words, the at least one data packet for querying the address of at least one communication-ready data bus subscriber is first sent by the local bus master, then received by the at least one communication-ready data bus subscriber the address of which is being queried, changed by this data bus subscriber, and then sent back to the local bus master. The changing of the data packet may be writing the communication-ready data bus subscriber's address into the data packet. Thus, the same data packet is sent and received by the local bus master, and is changed when it passes through the local bus, i.e. by the same data bus subscriber whose address is being queried.

In other words, the local bus master sends to the local bus the at least one data packet, which passes through the local bus; thus, at a given time, the at least one communication-ready data bus subscriber the address of which is being queried receives, processes and then forwards the packet. If the at least one data packet has passed through all the data bus subscribers connected to the local bus, the local bus master receives it back, and may read from the data packet the address information that the communication-ready data bus subscriber wrote. The local bus master may then map the address information to the relative position.

The local bus master may also be adapted to send not only one data packet, but a plurality of data packets. In this case, the number of data packets may correspond to the number of communication-ready data bus subscribers. This number may for example have been determined using another data packet. This additional data packet for counting may have been sent from the local bus master to the local bus before at least one data packet for querying the address was sent. The data packet for counting may therefore also be called the first data packet, and the at least one data packet for querying the address may be called the second data packet.

The additional data packet or first data packet may have a different counter value that differs from the counter value of the at least one data packet or the counter value of the second data packet. This other counter value may be changed, for example incremented or decremented, by any communication-ready data bus subscriber. In this case, the other counter value may be a binary value counter. In other words, a single data packet first determines the number of data bus subscribers that are already communication-ready. In this communication phase, no addressing of the data bus subscribers is necessary. The local bus master may send the data packet for counting without addressing to the local bus. Upon receiving the individual data packet, every data bus subscriber that is already communication-ready may change the other counter value contained in the data packet before forwarding the data packet or parts of the data packet to the next data bus subscriber.

Data bus subscribers that are not yet communication-ready only pass the individual data packet through, without changing the other counter value. A data bus subscriber may be communication-ready if it is clock-synchronized with the local bus and is able to receive and forward the individual data packet and carry out processing operations on the individual data packet. If the local bus is a ring bus, the data packet is sent back to the local bus master by the last data bus subscriber, regardless of whether that subscriber is communication-ready or not. Alternatively, the ring bus may also be closed by a termination unit, which may also be referred to as a bridge unit, and the termination unit may send the data packet received in the downstream direction back in the upstream direction. This happens either again passing through all data bus subscribers so that they may again carry out a processing operation, or bypassing all data bus subscribers via a bypass connection.

Based on the other counter value, the local bus master then knows how many data bus subscribers of the local bus are already communication-ready. The data bus subscribers have thus increased the other counter value in the sequence in which they have become communication-ready. The other counter value thus corresponds to the relative position of the respective communication-ready data bus subscribers, viewed relative to the local bus master. In other words, the communication-ready data bus subscriber that comes first as seen from the local bus master, that changes the other counter value, has the first relative position, the second communication-ready data bus subscriber has the second relative position, and so forth. From a physical standpoint, any number of non-communication-ready data bus subscribers or empty local bus positions may be arranged between the local bus master and the first communication-ready data bus subscriber, and likewise between the first and second communication-ready data bus subscriber, and so forth. The relative position of the communication-ready data bus subscribers depends only on their communication readiness.

If, for example, the other counter value indicates that there are N communication-ready data bus subscribers, then N second data packets are also generated and sent on the local bus, in order to query the addresses of the respective communication-ready data bus subscribers.

In this case, a respective generated second data packet is intended for a respective communication-ready data bus subscriber and is assigned thereto based on the respective relative position of the communication-ready data bus subscriber in the sequence of communication-ready data bus subscribers. Each data packet of the plurality of second data packets is assigned to exactly one data bus subscriber, which uses this data packet to transmit an address to the local bus master.

Each of the data packets may have a counter value for controlling the query, using which the data packet may be mapped to the respective communication-ready data bus subscriber. This counter value is therefore used for relative addressing of the data bus subscribers. The counter value of each data packet may be set at a predetermined incremental count offset from a reference value, so that the count offset corresponds to a positional offset in the sequence of communication-ready data bus subscribers. If a data bus subscriber recognizes that a counter value of a data packet that is used for the relative addressing corresponds to a specific reference value, this data bus subscriber recognizes that the data packet carrying this counter value is intended for the data bus subscriber. In the case of relative addressing, each data bus subscriber changes the counter value of each of the plurality of data packets. The change in this case may be an incrementing or decrementing of the counter value. In this case, the local bus master may be adapted to adjust the counter value according to the number of counted data bus subscribers. In addition, each counter value of each data packet is adapted in such a way that the counter values of each data packet differ and, due to the data bus subscribers changing the counter value, the counter value in each data packet approaches or reaches a reference value, and reaches a reference value at only one communication-ready data bus subscriber. The reference value may, for example, be the same reference value in all data bus subscribers, so that the second counter value of each data packet differs. Thus, the counter value of each data packet may be set to a certain starting value, and the starting value of each data packet may differ. If the counter value of one of the data packets reaches a reference value at a communication-ready data bus subscriber when it passes through the local bus, this data bus subscriber will know that the data packet is intended for this data bus subscriber.

For this purpose, each data bus subscriber may be designed so as to perform a comparison between the counter value in each data packet and a reference value. For example, the counter value may be represented by a binary representation. For example, the data packet that is the first to be sent to the local bus may have a counter value that corresponds to the highest binary representation of the possible value range for the counter value. Thus, the counter value of the first data packet sent has only ones. In this case, the value range may be a function of the maximum number of data bus subscribers that may be connected to the local bus.

If the first data bus subscriber increments the counter value of the first data packet sent, the counter value experiences a zero crossing, i.e. the binary representation has only zeros. Alternatively, the reference value may also be a zero crossing of the final bits of a plurality of signifiers. If the reference value of the first data bus subscriber is zero. If the reference value is zero, the first data bus subscriber detects that the first data packet sent is directed to the first data bus subscriber. The second data packet sent to the local bus may be intended for, i.e. directed to, the second data bus subscriber. In this data packet, the local bus master may set the counter value to a value that two data bus subscribers may increment before the value registers a zero crossing. The second data packet sent may thus be incremented by the first data bus subscriber, and is incremented by this subscriber to the highest binary representation, i.e. to a value that has only ones. But because no zero crossing was recorded, the first data bus subscriber knows that this data packet is not intended for the first data bus subscriber and forwards it on the local bus to the next communication-ready data bus subscriber. This subscriber in turn increments the already-incremented counter value. In this case, a zero crossing is recorded, and thus the second communication-ready data bus subscriber knows that this second data packet sent is intended for the second data bus subscriber. In this way, the local bus master may map to the respective communication-ready data bus subscriber, or address to the respective data bus subscriber, all data packets of the plurality of data packets, by means of the counter value and its reaching of a reference value.

The skilled person will understand that even though incrementing is described here and a zero crossing is assumed as the reference value, this may also be accomplished by decrementing and a ones crossing. In other words, the counter value of the first of the data packets is set to zero, and if the counter value is decremented, it jumps to ones only. The second of the data packets then contains a one as the starting value for the counter value, and so forth. In addition, the skilled person will understand that other counting mechanisms may also be used, and the counter value may be set up accordingly so as to correspond to these counting mechanisms, and the counter value assumes a reference value at a communication-ready data bus subscriber only exactly once, so that a bijective mapping of the data packets results. When a data bus subscriber detects that a data packet is directed to the data bus subscriber because the counter value in that data packet has reached a reference value corresponding to a reference value stored in the data bus subscriber, the data bus subscriber may write information stored in the data bus subscriber into a field of the data packet. For example, the data bus subscriber may write its address into an address data field. In this way, the local bus master may collect information about the data bus subscribers that may be used to identify the data bus subscribers connected to the local bus. Thus, the local bus master may assign a data packet to a data bus subscriber by setting the counter value of each data packet accordingly, so that when a reference value is reached, the data bus subscriber knows that the corresponding data packet is directed to the data bus subscriber.

The sending of the at least one data packet for querying the address of at least one communication-ready data bus subscriber and/or the sending of another data packet for counting the communication-ready data bus subscribers can be repeated until a status signal at a status signal input of the local bus master signals that all data bus subscribers connected to the local bus are communication-ready. The status signal of each data bus subscriber may then be conditionally changed from the last data bus subscriber to the local bus master. "Conditionally" here means that a data bus subscriber only changes the status signal or the state of the status signal when the data bus subscriber itself is communication-ready and its status signal input indicates that the subsequent data bus subscribers are also communication-ready. In this way, there is only a defined state of the status signal or a defined status signal at the local bus master when all data bus subscribers in the local bus are communication-ready.

This status signal may have discrete states. A logical one (high state) may indicate that not all data bus subscribers on the local bus are communication-ready yet, and a logical zero (low state) may indicate that all data bus subscribers on the local bus are communication-ready. However, the skilled person will also understand that communication readiness may be indicated by other logical states. At the outset, each data bus subscriber takes on the state of the status signal that indicates that it is not communication-ready. Either the last data bus subscriber or a termination unit of the local bus first takes on a state that indicates communication readiness. This state of the status signal is forwarded to the upstream data bus subscriber and received at its status signal input. Only when this data bus subscriber is likewise communication-ready does this data bus subscriber change the state of the status signal at its status signal output and thus forward the status signal to the next data bus subscriber. This subscriber in turn only changes the state at its status signal output if the status signal input indicates that the subsequent data bus subscribers are already communication-ready, and the data bus subscriber itself is communication-ready. Thus, the state of the status signal at the local bus master does not change until all data bus subscribers of the local bus are communication-ready. As long as this state has not yet occurred, the local bus master may query the already communication-ready data bus subscribers using a single data packet sent to the local bus, and query the addresses of these communication-ready data bus subscribers using of the plurality of data packets. If the state of the status signal changes, the local bus master knows that all counted data bus subscribers are now communication-ready and that all address information is available to the local bus master. In this case in turn, the local bus master may still send a single data packet to the local bus in order to check whether the previously collected information is correct and whether the change in state of the status signal is due to an error.

The above-mentioned object is also accomplished by a local bus master of a local bus, in particular a ring bus, the local bus master having a receiver for receiving at least one data packet from a communication-ready data bus subscriber, wherein the at least one data packet has an address of the one communication-ready data bus subscriber, wherein the communication-ready data bus subscriber is in a sequence of communication-ready data bus subscribers; and a mapper for mapping the received address to a relative position of the communication-ready data bus subscriber in the sequence of communication-ready data bus subscribers. The receiver may be a receiver or transceiver circuit. The mapper may be, for example, a processor, a microcontroller or a computing circuit. The computing circuit may be designed as a digital logic circuit that in particular is designed as at least a part of a semiconductor chip. The circuits may be implemented in an application-specific integrated circuit (ASIC) or in a field programmable gate array (FPGA).

The local bus master additionally has a transmitter for sending the at least one data packet to all data bus subscribers for querying the address of the at least one communication-ready data bus subscriber, and a transmitter for sending another data packet to all data bus subscribers for counting the data bus subscribers that are communication-ready in sequence, the other data packet being sent for counting before sending the at least one data packet for querying the address, and the other data packet having another counter value that each communication-ready data bus subscriber changes in sequence. The sender may be a transmitter or transceiver circuit, which may be implemented as ASIC or FPGA.

The transmitter for sending the at least one data packet for querying the address of the at least one communication-ready data bus subscriber may also be adapted for sending a plurality of data packets, wherein the number of data packets may correspond to the number of communication-ready data bus subscribers.

The transmitter for sending the at least one data packet or the plurality of data packets may be the same as the transmitter for sending the other data packet. The transmitter or sender may be, for example, a transmitter or transceiver circuit, which may be implemented as ASIC or FPGA.

A preferred embodiment of the local bus master according to the invention also has a former for forming the at least one data packet for querying the address and the other data packet for counting. The former may be adapted so as to format the data packets according to the format used on the local bus. For example, the former may generate at least one cycle frame that has the corresponding data packets and the transmitter may send that cycle frame to the local bus. Alternatively, the data packet for counting and the at least one data packet for querying the address may also be sent in different cycle frames, with the former forming the respective cycle frames.

In another preferred embodiment, the local bus master according to the invention has a status signal input for receiving a status signal, and the status signal or the state of the status signal indicates whether all data bus subscribers connected to the local bus are communication-ready. In addition, the transmitter for sending the at least one data packet for querying the address and/or the transmitter for sending the data packet for counting may be adapted to repeat the sending of the data packets until a state of the status signal at the status signal input indicates that all data bus subscribers connected to the local bus are communication-ready.

The data packets transmitted on the local bus as described herein may also be referred to as data telegrams. The data packets may also be referred to as communication data packets, and are used in particular for programming and/or for controlling and/or for monitoring and/or for identifying at least one data bus subscriber. The at least one data packet for querying the address and the other data packet for counting may also be data packets of the same type.

Thus, the data packet for counting and the data packet for querying the address may only differ, for example, in terms of when they are sent to the local bus. The data packet for counting is preferably sent first, before sending the at least one data packet for querying the address, so that the number of data packets for querying the address may be adapted to the number of data bus subscribers counted by the previously-sent data packet.

The above-mentioned object is also accomplished by a system having a local bus master and at least one data bus subscriber. The local bus master and the at least one data bus subscriber are adapted and have the appropriate component to implement the above-described method for identifying communication-ready data bus subscribers. The corresponding component may be arranged in the local bus master or in the at least one data bus subscriber according to the function described in the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
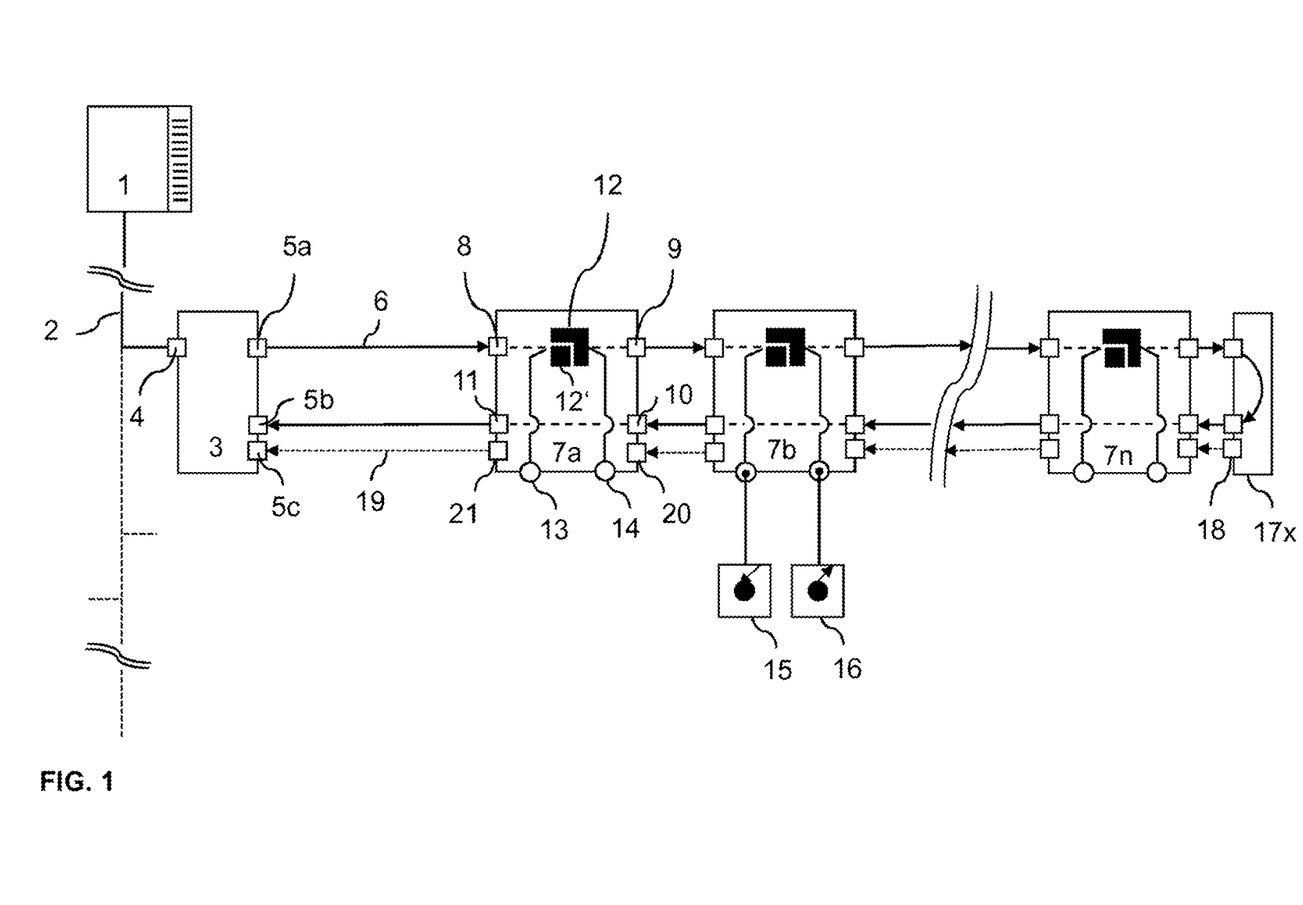
FIG. 1 shows a schematic block diagram of an exemplary automation system with a programmable logic controller, a higher-level bus, and a plurality of exemplary data bus subscribers according to the invention.

FIG. 1 shows a schematic block diagram of an automation system. The skilled person will understand that the automation system shown is only exemplary, and that all elements, modules, components, subscribers and units belonging to the automation system may be designed differently but may still fulfil the basic functionalities described herein.

The automation system shown in FIG. 1 has a higher-level controller 1, which may be implemented, for example, using a programmable logic controller (PLC). A PLC 1 of this type is basically used to control and regulate the process that the automation system carries out. Currently, however, PLCs 1 used in automation systems also perform more extensive functions, such as for example visualization, alarming and recording all data relating to the process; as such, the PLC 1 functions as a human-machine interface. There are PLCs 1 in different performance classes that have different resources (computing capacity, memory capacity, number and type of inputs and outputs, and interfaces) that enable the PLC 1 to control and regulate the process of the automation system. A PLC 1 usually has a modular structure and formed of individual components, each of which fulfils a respectively different task. A PLC 1 usually formed of a central computer assembly (with one or more main processors and memory modules) and a plurality of assemblies with inputs and outputs.

Such modularly-structured PLCs 1 may readily be extended by adding assemblies. In this case, which assemblies must be integrated into the PLC 1 will depend on the complexity of the process and the complexity of the structure of the automation system. In contemporary automation systems, the PLC 1 is usually no longer an independent system; instead, the PLC 1 is connected to an internet or intranet via corresponding interfaces.

As a result, the PLC 1 is part of a network via or from which the PLC 1 may receive information, instructions, programming and the like. For example, the PLC 1 may receive information about materials supplied to the process via a connection to a computer located in an intranet or internet, so that, for example, the process may be optimally controlled by knowing the number or nature thereof.

It is also conceivable that a user may control the PLC 1 by accessing it from an intranet or internet. For example, a user may use a computer, also known as a host computer, to access the PLC 1 and check, change or correct the PLC's user programming. Accordingly, the PLC 1 may be accessed from one or more remote maintenance or control stations. The host computers may have visualization devices for representing process workflows.

To control the process of the automation system, the PLC 1 is connected to automation devices. Bus systems are used for these connections to minimize wiring effort. In the exemplary embodiment shown in FIG. 1, the PLC 1 is connected to a local bus master 3 of a lower-level local bus system via a higher-level bus 2, which in the exemplary embodiment shown here may be a fieldbus. However, not only a local bus master 3 of a local bus as in the exemplary embodiment shown here, but also any other subscribers that are designed to communicate with the PLC 1, may be connected to the higher-level bus 2.

In the exemplary embodiment shown here, the higher-level bus 2 is connected to the local bus master 3. To this end, the local bus master 3 has a first interface 4 that is designed in such a way that it may be connected to the higher-level bus 2. For this purpose, the interface 4 may, for example, have a receptacle in the form of a socket, and the higher-level bus 2 may have a plug that the socket may accommodate. For example, the plug and socket may be a modular plug and modular socket, with each core of the higher-level bus 2 being electrically or optically connected to a connection in the modular socket. However, the skilled person will also be familiar with other options for designing an interface 4 so that the local bus master 3 may be electrically or optically connected to the higher-level bus 2. The skilled person will be familiar with screw, bearing, click or plug connections that may be used to establish an electrical or optical connection.

A male plug is usually accommodated by a female counterpart. This accommodation usually not only establishes the electrical or optical connection, but also ensures that the two parts are mechanically coupled and may only be separated from each other by applying a certain force. However, it is also possible that the higher-level bus 2 may be permanently wired to the interface 4.

The local bus master 3 in the exemplary embodiment shown here has an additional second interface to connect the local bus master 3 to the local bus. The local bus is advantageously designed in such a way that a data packet sent by the local bus master 3 is transmitted back to the local bus master 3 by all the data bus subscribers 7a, 7b, . . . , 7n connected to the local bus. In this case, a data bus subscriber 7a, 7b, . . . , 7n always receives only a part of the data packet the data bus subscriber 7a, 7b, . . . , 7n upstream of it. After a time period in which the data bus subscriber 7a, 7b, . . . , 7n may process the data contained in this part, it forwards the part to the downstream data bus subscriber 7a, 7b, . . . , 7n, and at the same time receives a new part of the data packet from the upstream data bus subscriber 7a, 7b, . . . , 7n. In this way, all parts of the data packet pass sequentially through all the data bus subscribers 7a, 7b, . . . , 7n. The local bus is advantageously designed with a ring-shaped structure. Such local buses may also be referred to as ring buses 6. The local bus may alternatively be designed to be stranded or star-shaped, or to have a combination or mixture of the above designs. In this case, the data packets are sent and received via the second interface of the local bus master 3. In the exemplary embodiment shown here, the second interface is divided into a first part 5a and a second part 5b. The first part 5a of the second interface establishes the downstream connection in the ring bus 6 and the second part 5b of the second interface establishes the upstream connection in the ring bus 6.

In the exemplary embodiment shown here, the ring bus 6, the data transmission direction of which is shown with arrows in the exemplary embodiment of FIG. 1, has data bus subscribers 7a, 7b, . . . , 7n. In the exemplary embodiment shown here, these data bus subscribers 7a, 7b, . . . , 7n each have a respective interface 8 in order to receive data from an upstream or preceding data bus subscriber 7a, 7b, . . . , 7n.

The data bus subscriber 7a receives data from the upstream local bus master 3 via the interface 8. In addition, in the exemplary embodiment shown here, the data bus subscribers 7a, 7b, . . . , 7n each respectively have an interface 9 in order to forward data to a downstream or subsequent data bus subscriber 7a, 7b, . . . , 7n. Data bus subscriber 7a sends data to the downstream data bus subscriber 7b via the interface 9. The interfaces 8 and 9 are used to propagate data in the downstream direction of the ring bus 6, i.e. away from the local bus master 3. Moreover, in this exemplary embodiment the data bus subscribers 7a, 7b, . . . , 7n also have interfaces 10 and 11 for propagating data in the upstream direction of the ring bus 6, i.e. toward the local bus master 3. In the case of the data bus subscriber 7a, the interface 10 is designed to receive data from the downstream or subsequent data bus subscriber 7b, and the interface 11 is designed to forward data to the upstream or preceding data bus subscriber, in this case the local bus master 3. Thus, it may also be said that the interfaces 9 and 11 are transmitter interfaces, while the interfaces 8 and 10 are receiver interfaces.

In the exemplary embodiment shown here, the connections of the interfaces and the PLC 1 or the data bus subscribers 7a, 7b, . . . , 7n are implemented with the aid of cables or printed circuit boards and/or by direct or indirect contacting using electrical contacts. Another alternative is that the individual connections are established wirelessly and the interfaces provide the necessary conversions for the radio standards used.

Although in the exemplary embodiment shown here, the local bus master 3 and the individual data bus subscribers 7a, 7b, . . . , 7n are shown spaced apart from each other, i.e. the local bus master 3 is arranged decentrally from the data bus subscribers 7a, 7b, . . . , 7n, the skilled person will understand that the data bus subscribers 7a, 7b, . . . , 7n and the local bus master 3—which also represents a data bus subscriber of the ring bus 6—may also be directly connected together. In this case, for example, contacts of one data bus subscriber may access corresponding receptacles or receiving contacts of a directly adjacent data bus subscriber in order to establish an electrical connection between the data bus subscribers so that data may be sent in the downstream and upstream directions.

For example, the data bus subscribers 7a, 7b, . . . , 7n may have receptacles on the side facing away from the master and contacts on the side facing toward the master. If the data bus subscribers 7a, 7b, . . . , 7n are then connected in sequence accordingly, the contacts of the one data bus subscriber 7a, 7b, . . . , 7n each engage in the respective receptacles of the other data bus subscriber 7a, 7b, . . . , 7n and an electrical connection may be established. The local bus master 3 in this case correspondingly has contacts on the side that engage with the receptacles of the first data bus subscriber 7a in order to establish an electrical connection between the interfaces 5a and 8 or the interfaces 5b and 11. However, the skilled person will also be familiar with other possibilities, for example pressure contacts, knife and fork contacts, for establishing an electrical or optical connection between two data bus subscribers 7a, 7b, . . . , 7n arranged directly next to each other using appropriate components.

If it is desired that data bus subscribers 7a, 7b, . . . , 7n and the local bus master 3 are directly connected together, they may also have mechanical mountings or mechanical fasteners using which the individual data bus subscribers 7a, 7b, . . . , 7n and the local bus master 3 may be connected to each other. For example, a data bus subscriber 7a, 7b, . . . , 7n may have a projection on one side and an undercut on the other. If the data bus subscribers 7a, 7b, . . . , 7n are then connected in sequence, a projection engages in an undercut of the other data bus subscriber 7a, 7b, . . . , 7n, so that a mechanical coupling occurs. For straightforwardly sequentially arranging the data bus subscribers 7a, 7b, . . . , 7n, they may also be arranged on a shared mounting, for example a top-hat rail. The data bus subscribers 7a, 7b, . . . , 7n may have appropriate fasteners for fastening onto the top-hat rail. Alternatively or additionally, the data bus subscribers 7a, 7b, . . . , 7n may also, for example, have detachably connectable fasteners with which the data bus subscribers 7a, 7b, . . . , 7n may be fastened either to the top-hat rail or to another mounting. For this purpose, the detachably connectable fasteners may be replaceable and a corresponding fastener for the desired mounting may be connected to the data bus subscribers 7a, 7b, . . . , 7n so that these may be fastened to the desired mounting.

In addition, the data bus subscribers 7a, 7b, . . . , 7n in the exemplary embodiment shown in FIG. 1 also have a processing unit 12, which for example formed of a processing component and a logic unit. The processing unit 12 may also be described as the complete circuit of the data bus subscriber. In other words, the processing unit 12 receives data via the inputs 8 and 10 and transmits data via the outputs 9 and 11. In addition, the processing unit 12 may receive or output data via the input/outputs 13 and 14. Moreover, the processing unit 12 has access to a memory 12' of the data bus subscriber 7a, 7b, . . . , 7n in which, for example, data, process data or instruction lists are stored.

The processing unit 12 may be designed to process received data and to output data. Data for processing may be received either from an upstream data bus subscriber or from inputs 13 of the data bus subscriber 7a, 7b, . . . , 7n. The inputs 13 of the data bus subscriber 7a, 7b, . . . , 7n may in this case be connected to sensors 15 that for example send measurement data, status data, and the like. Processed data may be output either to a downstream data bus subscriber or to outputs 14 of the data bus subscriber 7a, 7b, . . . , 7n. The outputs 14 of the data bus subscriber 7a, 7b, . . . , 7n may be connected to actuators 16, that for example carry out a certain action using the data directed to them. If data processing also takes place in the upstream direction, data may also be received from a downstream data bus subscriber 7a, 7b, . . . , 7n and processed data may be sent to an upstream data bus subscriber 7a, 7b, . . . 7n.

For the sake of simplicity, the data bus subscribers 7a, 7b, . . . , 7n are only shown with one input 13 and one output 14 in the exemplary embodiment shown here, and only data bus subscriber 7b is connected to a sensor 15 and actuator 16. However, the skilled person will be aware that the data bus subscribers 7a, 7b, . . . , 7n may have a multiplicity of inputs and outputs 13 and 14, and may be connected to a multiplicity of different sensors 15 and actuators 16. The characteristic feature of the sensors 15 is that the sensors 15 receive data or signals and send them to the data bus subscribers 7a, 7b, . . . , 7n, while the actuators 16 receive data or signals from the data bus subscribers 7a, 7b, . . . , 7n and perform an action based on these data or signals.

Alternatively, the interfaces 8, 9, 10 and 11 may be integrated in a module unit and the data bus subscribers 7a, 7b, . . . , 7n may be plugged into this module unit. The module units may also be described as basic elements of the ring bus 6. The ring bus infrastructure is set up by the module units and the data bus subscribers 7a, 7b, . . . , 7n are replaceable, so that the ring bus 6 may be set up with any arbitrary data bus subscribers 7a, 7b, . . . , 7n. The module units also serve to ensure that communication between the remaining data bus subscribers 7a, 7b, . . . , 7n is not interrupted even if a data bus subscriber 7a, 7b, . . . , 7n is removed, because communication takes place via the remaining module units.

The data bus subscribers 7a, 7b, . . . , 7n shown in this exemplary embodiment are often referred to as I/O modules, due to their inputs and outputs 13, 14, which may be connected to sensors 15 or actuators 16. Although the data bus subscribers 7a, 7b, . . . , 7n are shown as spatially separated from the sensors 15 or actuators 16 in the exemplary embodiment shown here, the sensors 15 or actuators 16 may also be integrated into the I/O module.

The ring bus 6 shown in this exemplary embodiment is based on cycle frame communication.

For example, a cycle frame may be defined as a recurring (cyclic), preferably equidistant, time interval in which data may be transferred on the ring bus 6. For example, the cycle frame has at least a start identifier (SOC) and a time range for transmitting data. A plurality of start identifiers (SOC) of successive cycle frames are advantageously offset equidistantly in time. The aforementioned time range is intended for transmitting data packets. The start identifier (SOC) and data packets are transmitted via the ring bus 6 and pass through all data bus subscribers.

The start identifier (SOC) is separate, i.e. may be transferred as an independent symbol or may be advantageously contained in a start data packet (SOC packet).

Zero, one or more data packets are transferred within the time range of the cycle frame. Advantageously, idle data is inserted in a cycle frame, in particular adjoining at least one data packet. Advantageously, the transmission of the data packets and/or idle data causes an uninterrupted signal on the local bus. The signal enables the data bus subscribers to synchronize with it in terms of time. Advantageously, the cycle frame additionally has a trailer. The trailer has a variable length and follows the time range for data transmission, preferably up to the next start identifier (SOC) of the next cycle frame. Advantageously, the trailer has idle data.

Each data packet is sent in a downstream direction from the local bus master 3 to the first data bus subscriber 7a of the ring bus 6. This subscriber receives a first part of the data packet via the interface 8. Such a part of the data packet is also referred to below as a "piece" or "unit." The data bus subscriber 7a then carries out a processing operation on the part, and then forwards the part to the next data bus subscriber 7b via the interface 9; preferably at the same time, the first data bus subscriber 7a receives a second part of the data packet, and so forth. The size of the parts of the data packet, i.e. the chunking of the data packet, depends on the receiving capacity of the data bus subscribers 7a, 7b, . . . , 7n; for example, a fixed number of bits, for example 8 bits of the data packet, may be simultaneously available for processing at the data bus subscriber 7a, 7b, 7n.

Accordingly, the data packet passes through the data bus subscribers 7a, 7b, . . . , 7n in units, chunks or parts, for example in parts or symbols of 8 bits. The part of the data packet that the last data bus subscriber has processed (in the exemplary embodiment shown here, data bus subscriber 7n), then passes through the ring bus 6 in the upstream direction, so that the parts starting from the last data bus subscriber 7n are again sent upstream in the direction of local bus master 3 by all data bus subscribers 7a, 7b, . . . , 7n. For this purpose, either the last data bus subscriber 7n has a switchable bridge that connects the interface 9 with the interface 10, or a switchable bridge is connected to the last data bus subscriber 7n, which assumes the function of forwarding the parts of the data packet from the interface 9 to the interface 10.

Alternatively, the interface 10 of the data bus subscriber 7n may also be connected directly to the interface 5b of the local bus master 3 using a bypass line.

In the upstream direction, the units of the data packet or data packets may be looped back to the local bus master 3 by the individual data bus subscribers 7a, 7b, . . . , 7n, as in the exemplary embodiment shown here, without further processing. However, it is also conceivable that in the upstream direction the units of the data packet are processed again, so that the data packet may be processed twice, once in the downstream direction to the last data bus subscriber 7n and once in the upstream direction to the local bus master 3. For example, processing may take place in the upstream direction by signal refreshing and/or phase shifting.

As already described above, the exemplary embodiment in FIG. 1 shows the termination unit 17x, which is connected to the data bus subscriber 7n. The termination unit 17x connects the interfaces 9 and 10 of the data bus subscriber 7n, so that the cycle frame or data packets routed in the downstream direction are sent back to the local bus master 3, i.e. upstream, by all data bus subscribers 7a, 7b, . . . , 7n in reverse sequence. The cycle frame or the data packets or the parts of the data packets may be processed again in the upstream direction by the data bus subscribers 7a, 7b, . . . , 7n, or may only be passed along by the data bus subscribers 7a, 7b, . . . , 7n without further processing. The termination unit 17x also provides a status signal at its status signal output 18, which has a predefined status signal value or status. The data bus subscriber 7n receives this status signal, or the status signal value of the termination unit 17x, at its status signal input 20n. If the data bus subscriber 7n is communication-ready, i.e. if the data bus subscriber 7n is clock-synchronized with the local bus 6 and the processing unit 12n is able to process data packets, then the data bus subscriber 7n changes its status signal value at its status signal output 21n to a status signal value that indicates its communication readiness.

The status signal value or the state thereof may, for example, assume a low state prior to communication readiness and a high state after communication readiness is established. The status signal value may accordingly be switched from a logical zero to a logical one. However, the skilled person will understand that other states or status signal values may also be defined that indicate communication readiness. It is only important that there is a change in the status signal value at the status signal output when communication readiness has been established. As an alternative to the termination unit 17x shown here, the data bus subscriber 7n may also take over the functionality of the termination unit 17x itself. In other words, if the data bus subscriber 7n determines that it is the last data bus subscriber of the local bus 6 and that no termination unit 17x is connected, then the data bus subscriber 7n itself may send the data packets that it received in the downstream direction back in the upstream direction. The data bus subscriber 7n may be adapted accordingly in this case so as to establish a connection between the interface 9 and the interface 10. In this case, the data bus subscriber 7n may also be adapted to carry out a change in the status signal value at its status signal output 21n after it has established communication readiness, even if no status signal value is present at its status signal input 20n.

When the status signal value is changed at the status signal output 21n, a status signal value is applied to the data bus subscriber 7b at its status signal input 20b, which indicates that the data bus subscriber 7n is communication-ready. Because this status signal value is the same status signal value that is output by the termination unit 17x—if present—the status signal may be said to be fed through the data bus subscriber 7n when the subscriber is communication-ready. Accordingly, the status signal is also routed through the other data bus subscribers 7a, 7b if they are communication-ready. If all data bus subscribers 7a, 7b, . . . , 7n are communication-ready, it may be said that a status signal line exists between the termination unit 17x with its status signal output 18 and the local bus master 3 with its status signal input 5c. This status signal line may be a physical line that establishes an electrical or optical connection between the status signal output 18 and the status signal input 5c by means of switches or couplers. This status signal line may transmit the original status signal from the status signal output 18 to the status signal input 5c.

As already described above, this signal line may also only represent a connection between the status signal output 21n of the last data bus subscriber 7n and the status signal input 5c, specifically in the case where no termination unit 17x is present. As an alternative to establishing a physical connection, the signal line may also exist only in organizational terms, with each data bus subscriber 7a, 7b, . . . , 7n functioning as a repeater of the status signal value at its status signal input 20a, 20b, . . . , 20n and generating the same status signal value at its status signal output 21a, 21b, . . . , 21n, if the data bus subscriber 7a, 7b, . . . , 7n is communication-ready and the status signal value at the status signal input 20a, 20b, . . . 20n indicates that the downstream data bus subscribers are also communication-ready. This may also be referred to as a status signal line, because in this case as well, the status signal value of the status signal output 18 of the termination unit 17x or the status signal value of the status signal output 21n of the last data bus subscriber 7n is also forwarded to the status signal input 5c of the local bus master 3, even if no direct physical connection exists between the status signal output 18 of the termination unit 17x or the status signal output 21n of the data bus subscriber 7n and the status signal input 5c of the local bus master 3. In the case of a purely organizational status signal line, it may also be said that a physical connection exists only between two respective data bus subscribers 7a, 7b, . . . , 7n but there is no physical connection between all data bus subscribers 7a, 7b, . . . 7n.

Even if the status signal line in the exemplary embodiment shown here is illustrated similarly to the local bus 6, the status signal line is separate from the local bus 6. Thus, the status signal is not propagated via a bus line that is designed to carry data.

So that the local bus master 3 may identify the data bus subscribers 7a, 7b, . . . , 7n that are already communication-ready, it queries the addresses of the communication-ready data bus subscribers 7a, 7b, . . . , 7n and repeats this query until the status signal, or the status signal value of the status signal, or the state of the status signal, at the status signal input 5c of the local bus master 3 signals that all data bus subscribers 7a, 7b, . . . , 7n connected to the local bus 6 are communication-ready.

Figure 2:
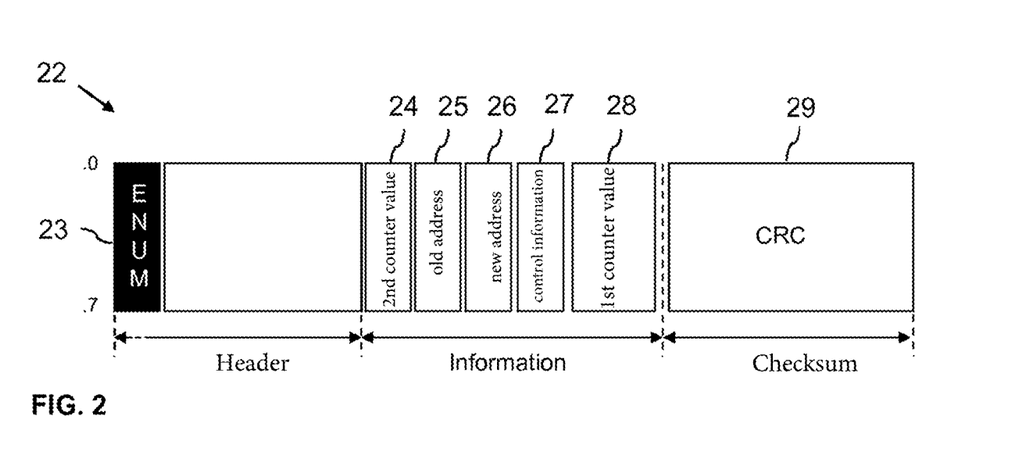
FIG. 2 shows an exemplary data packet.
Figure 3:
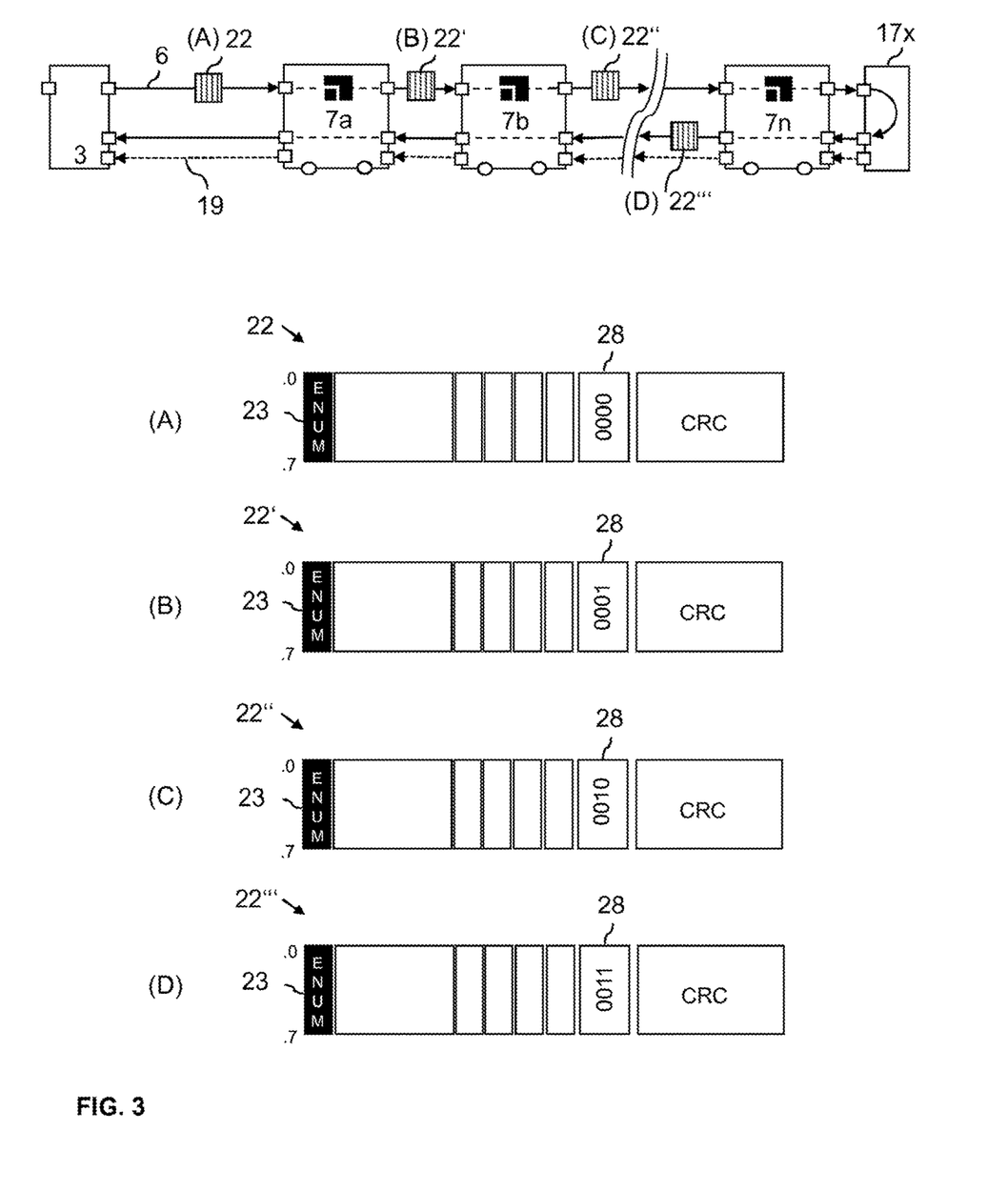
FIG. 3 shows the sending of a single data packet through the data bus subscribers shown in FIG. 1 to count the data bus subscribers.
Figure 4A:
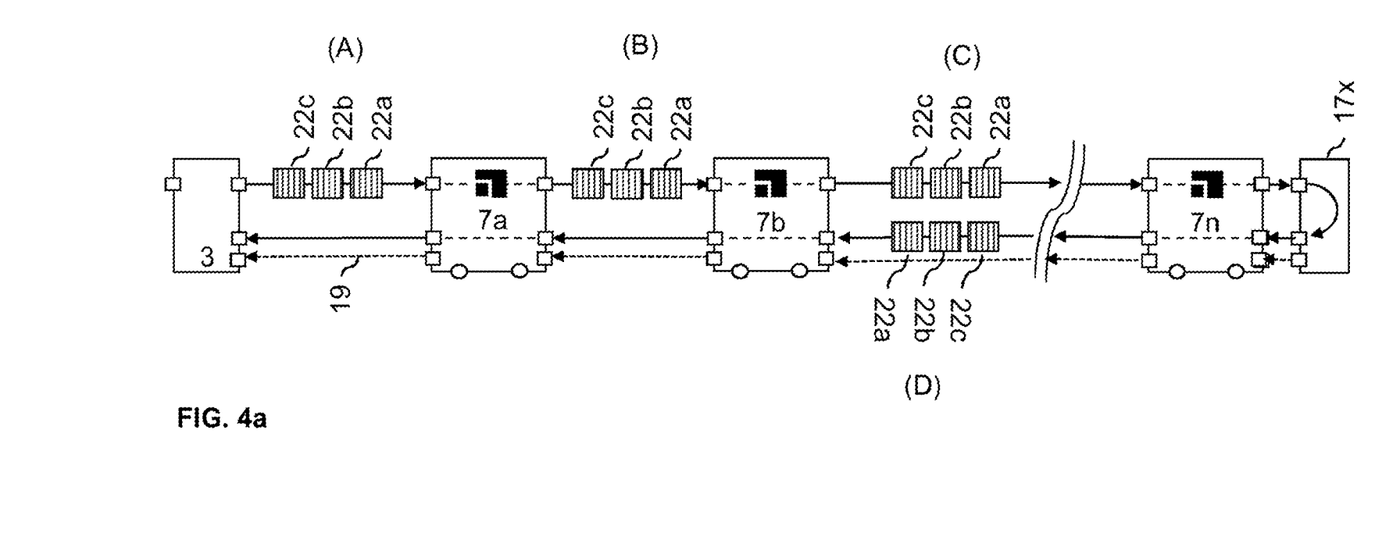
FIGS. 4a and 4b show the sending of a plurality of data packets by the data bus subscribers shown in FIG. 1 for querying the addresses of the data bus subscribers.
Figure 4B:
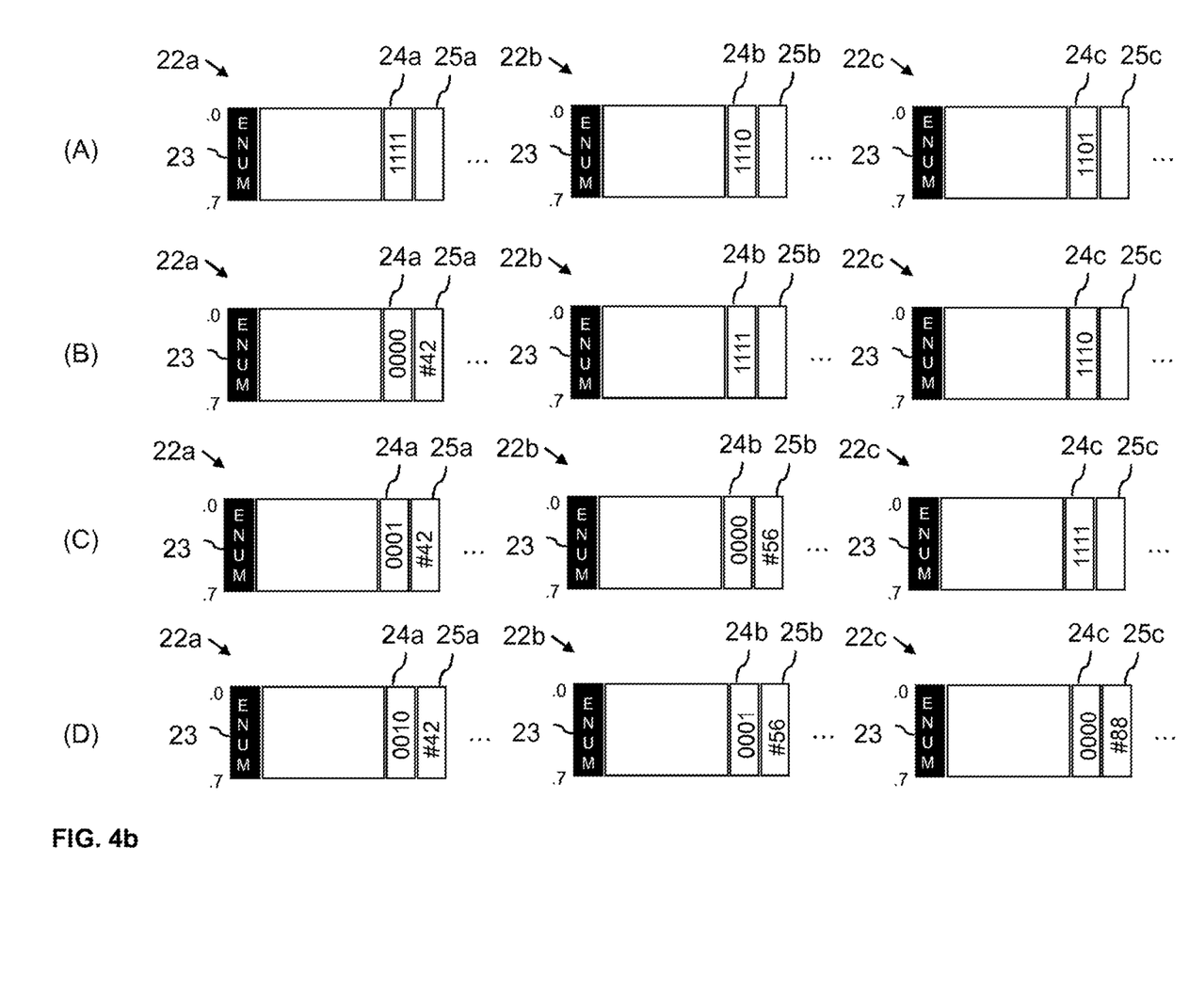

For this purpose, the local bus master 2 uses first and second data packets. An exemplary data packet is shown in FIG. 2. FIGS. 3 and 4 show an exemplary address query using the data packet shown in FIG. 2.

The data packet 22 shown by way of example in FIG. 2 formed a general header part or "header," an information part or "payload," and a checksum part or "checksum."

The header contains a field 23 that contains a unique bit pattern ENUM that occurs only once, which may also be referred to as a codeword or identifier. The number and configuration of unique bit patterns or code words depend on the coding used on the local bus 6. Alternatively or additionally, special bit patterns or code words may be defined in the bus protocol used. It is only of importance that the data bus subscribers 7a, 7b, . . . , 7n may bijectively identify the type of data packet 22 based on the bit pattern or codeword of the field 23. In the exemplary embodiment shown here, the data bus subscribers 7a, 7b, . . . , 7n are aware that if they receive a field 23 with an ENUM bit pattern, it is a data packet 22 for the address query process.

The header may also contain additional information that may be used to control or verify the data packet 22 and the data it contains. The skilled person will know of a multiplicity of fields that the header may contain.

The information part of the data packet 22 comprises a plurality of fields that may be used for identification and interim identification. The data packet 22 in this case has a first counter value 28 and a second counter value 24. The first counter value 28 is used to count the communication-ready data bus subscribers 7a, 7b, . . . , 7n on the local bus 6. In this case, the first counter value 28 of each data bus subscriber 7a, 7b, . . . , 7n that is communication-ready, i.e. of each data bus subscriber 7a, 7b, . . . , 7n that is able to process the data packet 22, is changed.

This change may include incrementing or decrementing the counter value 28. When the data packet 22 has passed through the local bus 6, i.e. has arrived back at the local bus master 3, the local bus master knows how many communication-ready data bus subscribers 7a, 7b, . . . , 7n are connected to the local bus 6. In addition, the data packet 22 also has a second counter value 24, which is used to assign the data packet 22 to the communication-ready data bus subscribers 7a, b, . . . , 7n, as explained in greater detail below with regard to FIGS. 3 to 4.

Moreover, the data packet 22 has a field 25 that the data bus subscribers 7a, 7b, . . . , 7n may use to communicate their stored address to the local bus master 3. This field 25 may also be referred to as an address data field. The data packet 22 also has a field 26 with which the local bus master 3 may assign a new address to the data bus subscribers 7a, 7b, . . . , 7n. In addition, the data packet 22 may also have an additional field 27 that may carry control information for the respective data bus subscribers 7a, 7b, . . . , 7n. The skilled person will understand that although a specific sequence and number of fields 24 to 28 are specified here, it is also possible to deviate from this arrangement and number of fields without departing from the subject matter of the invention.

In the exemplary embodiment shown here, the data packet 22 is divided into symbols of respectively 8 bits each. The data bus subscribers 7a, 7b, . . . , 7n also receive and process the data packet 22 chunked in this fashion. In other words, first the local bus master 3 sends the symbol or field ENUM 23 to the first data bus subscriber 7a, and after a predetermined time, the local bus master 3 sends another symbol of the header of the data packet 22 to the data bus subscriber 7a, which in turn at the same time sends the symbol or field ENUM 23 to the data bus subscriber 7b. In this way, all parts of data packet 22 pass through the respective data bus subscribers 7a, 7b, . . . 7n, and at any given time each data bus subscriber 7a, 7b, . . . , 7n always only holds one piece or part of data packet 22 that it may process.

FIG. 3 shows an exemplary initialization of the local bus 6. In the exemplary embodiment shown here, all data bus subscribers 7a, 7b, . . . , 7n are already communication-ready, which is also indicated by the completeness of the status signal line 19. At a given time, the local bus master 3 sends a data packet 22 in symbol form to the communication-ready data bus subscriber 7a. This is indicated by the data packet 22 at position (A) of the local bus 6. Thus, the data bus subscriber 7a first receives the field 23 of the data packet 22 with the bijective bit pattern and is aware that an initialization is now taking place. If the field 28 is then received at the data bus subscriber 7a, it may be used for processing, i.e. to change the value of this field 28. In the exemplary embodiment shown here, the field 28 has a binary value and the data bus subscriber 7a increments the binary value. In the exemplary embodiment shown here, the local bus master 3 has set the first counter value 28 to 0000 and the data bus subscriber 7a has incremented this value by one to 0001. Thus, after passing through the data bus subscriber 7a, the data packet differs from the data packet 22 as sent by the local bus master 3, as is shown in the exemplary embodiment shown here by identifying the data packet as data packet 22'. This same data bus subscriber 7a also sends the data packet 22' in symbol form to the next data bus subscriber 7b. This is indicated by the data packet 22' at position (B) of the local bus 6.

As soon as the data bus subscriber 7b receives the field 28 of the data packet 22', this field is incremented again. In the exemplary embodiment shown here, it is incremented from 0001 to 0010. Thus, after passing through the data bus subscriber 7b, the data packet differs from the data packet 22', which was sent by the data bus subscriber 7a; this is shown in the exemplary embodiment shown here with the marking of the data packet as data packet 22". The data bus subscriber 7b itself also sends the data packet 22" in symbol form to the next data bus subscriber 7n. This is indicated by the data packet 22" at position (C) of the local bus 6.

As soon as the data bus subscriber 7n receives the field 28 of the data packet 22", the field is incremented again. In the exemplary embodiment shown here, it is incremented from 0010 to 0011. Thus, after passing through the data bus subscriber 7n, the data packet differs from the data packet 22', which was sent by the data bus subscriber 7b; this is shown in the exemplary embodiment shown here with the marking of the data packet as data packet 22". The data bus subscriber 7b also sends the data packet 22'" in symbol form to the termination unit 17x. The termination unit connects the interface 9n with the interface 10n of the data bus subscriber 7n, so that the sent data packet 22'" is sent back upstream to the local bus master 3 through all the data bus subscribers 7a, 7b, . . . , 7n. This is indicated by the data packet 22'" at position (D) of the local bus 6. In the exemplary embodiment shown here, the data packet 22'" is not re-processed.

The local bus master 3 may then read out the counter value 28 from the data packet 22'" and may thus ascertain how many data bus subscribers 7a, 7b, . . . , 7n are present on the local bus 6.

Subsequently, the local bus master 3 again generates data packets 22 in the number of the communication-ready data bus subscribers 7a, . . . , 7n, . . . , . . . , 7n as indicated by the first counter 28; this is shown in FIG. 4.

In the exemplary embodiment shown here, the local bus master 3 generates three data packets 22a, 22b, 22c according to the counter value 28. Each data packet 22a, 22b, 22c has a counter value 24a, 24b, 24c. Using this counter value 24a, 24b, 24c, the three data packets 22a, 22b, 22c are mapped to the communication-ready data bus subscribers 7a, 7b, . . . , 7n. For this purpose, the local bus master 3 sets the counter value 24a of the first data packet 22a to the highest binary representation that the second counter value 24a is capable of, namely 1111 in the exemplary embodiment shown here, or to another arbitrary starting value. The second counter value 24b of the second data packet 22b is set to a value decremented by one relative to the data packet 22a; in this case, to 1110. The second counter value 24c of the third data packet 22c is set to a value that is reduced by one relative to the data packet 22b; here, to 1101.

Subsequently, the data packets 22a, 22b, 22c are sent from the local bus master 3 to the first data bus subscriber 7a. This is indicated by the data packets 22a, 22b, 22c at position (A) of the local bus 6.

The first data bus subscriber 7a receives the three data packets 22a, 22b, 22c in symbol form. The data bus subscriber 7a increments the respective counter value 24a, 24b, 24c of the three data packets 22a, 22b, 22c. If when incrementing one of the counter values 24a, 24b, 24c, the data bus subscriber 7a determines that there is a zero crossing, i.e. that the counter value 24a, 24b, 24c of a data packet 22a, 22b, 22c jumps to zero when incrementing, then the data bus subscriber 7a recognizes that the corresponding data packet 22a, 22b, 22c in which the counter value 24a, 24b, 24c jumps to zero is directed to the data bus subscriber 7a. In the exemplary embodiment shown here, the first data packet 22a is directed to the data bus subscriber 7a. At this data bus subscriber 7a, the counter value 24a experiences a zero crossing when the data bus subscriber 7a increases the counter value 24a. In this case, the data bus subscriber 7a knows that the subsequent symbols that pass through the data bus subscriber 7a are intended for this data bus subscriber 7a. For this reason, the counter value 24a is also prepended to the other fields in the data packet 22a, so that when a zero crossing of the counter value 24a is detected, the data bus subscriber 7a may process the subsequent symbols. In the exemplary embodiment shown here, the data bus subscriber 7a is designed to write its address into a field 25a of the data packet 22a directed to the data bus subscriber 7a. In the exemplary embodiment shown here, the address of the data bus subscriber 7a is #42. The data bus subscriber 7a ascertains the end of data packet 22a by receiving the symbol with the bijective bit pattern 23 of the second data packet 22b. The data bus subscriber 7a also increases the counter value 24b of the second data packet 22b as soon as the corresponding symbol of the data packet 22b is available to the data bus subscriber 7a. Because the local bus master 3 has adapted the counter value 24b in such a way that the counter value 24b of the second data packet 22b was lowered by one compared to the counter value 24a of the first data packet 22a, no zero crossing is recognized yet; instead, the counter value 24b of the second data packet 22b is only shifted from 1110 to 1111.

The data bus subscriber 7a also increases the counter value 24c of the third data packet 22c as soon as the corresponding symbol of the data packet 22c is available to the data bus subscriber 7a. Because the local bus master 3 has adapted the counter value 24c in such a way that the counter value 24c of the third data packet 22c was lowered by one compared to the counter value 24b of the second data packet 22b, no zero crossing is recognized yet; instead, the counter value 24c of the third data packet 22c is only shifted from 1101 to 1110. The data bus subscriber 7a forwards the data packets 22a, 22b, 22c in symbol form to the next data bus subscriber 7b. This is indicated by the data packets 22a, 22b, 22c at position (B) of the local bus 6.

The data bus subscriber 7b likewise receives the data packets 22a, 22b, 22c in symbol form and this data bus subscriber 7b is also adapted to increase the counter value 24a, 24b, 24c. This causes the counter value 24a of the first data packet 22a to be switched from 0000 to 0001 and causes the counter value 24b of the second data packet 22b to undergo a zero crossing. In this case, the data bus subscriber 7b recognizes that the second data packet 22b is directed to the data bus subscriber 7b and knows that the subsequent symbols in this data packet 22b are directed to the data bus subscriber 7b. As with the data bus subscriber 7a, the data bus subscriber 7b inserts its address into the field 25b of the second data packet 22b; in the exemplary embodiment shown here, the address of the data bus subscriber 7b is #56. The data bus subscriber 7b also increments the counter value 24c of the third data packet 22c from 1110 to 1111. In this case, however, no zero crossing is recorded. The data bus subscriber 7b sends the data packets 22a, 22b, 22c in symbol form to the next data bus subscriber 7n. This is indicated by the data packets 22a, 22b, 22c at position (C) of the local bus 6.

The data bus subscriber 7n likewise receives the data packets 22a, 22b, 22c in symbol form and this data bus subscriber 7n is also adapted to increase the counter value 24a, 24b, 24c. This causes the counter value 24a of the first data packet 22a to be switched from 0001 to 0010 and causes the counter value 24b of the second data packet 22b to be switched from 0000 to 0001. The counter value 24c of the third data packet 22c experiences a zero crossing. In this case, the data bus subscriber 7n recognizes that the third data packet 22c is directed to the data bus subscriber 7n and knows that the following symbols are directed to the data bus subscriber 7n.

As with the data bus subscribers 7a and 7b, the data bus subscriber 7n inserts its address into the field 25c of the third data packet 22c; in the exemplary embodiment shown here, the address of the data bus subscriber 7n is #88. The data bus subscriber 7n then forwards the symbols of the data packets 22a, 22b, 22c to the termination unit 17x, which sends them back upstream. This is indicated by the data packets 22a, 22b, 22c at position (C) of the local bus 6.

The local bus master 3 receives the data packets 22a, 22b, 22c with the fields 25a, 25b, 25c and thus learns that the data bus subscriber 7a has the address #42. The local bus master 3 may then assign this address #42 to the relative position of the data bus subscriber 7a. Thus, the local bus master 3 knows that there is a data bus subscriber 7a arranged at the first relative position that has the address #42. The same mappings may then also be take place for the data bus subscribers of relative positions two and three, namely that the data bus subscriber 7b has the address #56 at the second relative position, and the data bus subscriber 7n has the address #88 at the third relative position. In this case, the relative position is detached from the physical position of the data bus subscribers 7a, 7b, . . . , 7n in the local bus 6. For example, the first two relative positions may correspond to the physical positions of the data bus subscribers 7a, 7b. Between the data bus subscribers 7b and 7n, however, an arbitrary number of empty local bus positions may be physically present that are bridged only with regard to the status signal line 19 and the ring bus 6, for example using a module unit. Nonetheless, the data bus subscriber 7n still has relative position three, because it is the third communication-ready data bus subscriber.

The skilled person will understand that the relative addressing shown here with the second data packets 22a, 22b, 22c is only intended to serve as an example, and that other relative addressing may also be used in which a counter value of 24a, 25b, 24c of each communication-ready data bus subscriber 7a, 7b, . . . , 7n may be modified, but a reference value only occurs exactly once, so that each data packet 22a, 22b, 22c is assigned to exactly one communication-ready data bus subscriber 7a, 7b, . . . , 7n. This, in turn, allows the local bus master 3 to bijectively map the addresses of the communication-ready data bus subscribers 7a, 7b, . . . , 7n to the subscribers' relative position.

What is claimed is:

1. A method for identifying communication-ready data bus subscribers that are connected to a local bus, in particular a ring bus, the method
    sending at least one data packet from a local bus master to all of a plurality of communication-ready data bus subscribers in the local bus, for querying an address of a communication ready data bus subscriber, the at least one data packet having an address data field for writing in an address from one of the plurality of communication-ready data bus subscribers ready to communicate when queried for the address;
    receiving, at the local bus master, the at least one data packet transmitted via the local bus, the at least one data packet being received at the local bus master comprises the address of a communication-ready data bus subscriber, wherein the communication-ready data bus subscriber is in a sequence of communication-ready data bus subscribers; and
    mapping, via the local bus master, the received address to a relative position of the communication-ready data bus subscriber in the sequence of communication-ready data bus subscribers in the local bus,
    wherein said sending the at least one data packet is conducted before said receiving the at least one data packet.

2. The method according to claim 1, wherein for querying the address, the at least one data packet comprises a counter value for controlling the querying, and an address data field for writing the address of the at least one communication-ready data bus subscriber.

3. The method according to claim 2, wherein the same at least one data packet is transmitted by the local bus master, received by the one communication-ready data bus subscriber the address of which will be queried, sent by the one communication-ready data bus subscriber, and received by the local bus master.

4. The method according to claim 2, wherein sending the at least one data packet comprises sending a plurality of data packets, wherein the number of data packets corresponds to the number of communication-ready data bus subscribers.

5. The method according to claim 4, wherein each data packet for querying the address of a communication-ready data bus subscriber, corresponding to a relative position of the communication-ready data bus subscriber in the sequence of communication-ready data bus subscribers in the local bus, is included in the plurality of data packets.

6. The method according to claim 2, further comprising the local bus master assigning each data packet to an associated communication-ready data bus subscriber as a result of the local bus master setting the counter value of each data packet so as to be associated with a position in the sequence.

7. The method according to claim 6, wherein the setting of the counter value takes place at a predetermined incremental count offset from a reference value, so that the count offset corresponds to a position offset in the sequence of communication-ready data bus subscribers.

8. The method according to claim 2, additionally comprising: writing an address stored in the communication-ready data bus subscriber into the address data field of the data packet if the current counter value in the data packet corresponds to a reference value in the communication-ready data bus subscriber.

9. The method according to claim 1, wherein the data bus subscriber is communication-ready if the data bus subscriber is clock-synchronized to the local bus and a processing unit of the data bus subscriber is able to process data received via the local bus.

10. The method according to claim 2, additionally comprising: before sending the at least one data packet for querying the address, sending another data packet from the local bus master to all data bus subscribers in order to count the communication-ready data bus subscribers in sequence, wherein the other data packet has a different counter value for counting that each of the communication-ready data bus subscribers changes in sequence.

11. The method according to claim 10, additionally comprising: the local bus master identifying the plurality of communication-ready data bus subscribers based on the other counter value.

12. The method according to claim 2, wherein the sending of the at least one data packet for querying the address and/or the sending of the other data packet for counting is repeated until a status signal at a status signal input of the local bus master signals that all data bus subscribers connected to the local bus are communication-ready.

13. The method according to claim 12, wherein for each communication-ready data bus subscriber the local bus master sends a respective data packet for querying the address, if according to the status signal all data bus subscribers connected to the local bus are communication-ready, wherein the local bus master maps the addresses of each connected data bus subscriber to the position in the sequence for the physical position of each data bus subscriber in the local bus.

14. A local bus master of a local bus, in particular of a ring bus, the local bus master comprising:
    a transmitter for sending at least one data packet from a local bus master to all of a plurality of communication-ready data bus subscribers in the local bus, for querying an address of a communication ready data bus subscriber, the at least one data packet having an address data field for writing in an address from one of the plurality of communication-ready data bus subscribers ready to communicate when queried for the address;
    a receiver to receive the at least one data packet, the at least one data packet having the address of a communication-ready data bus subscriber, the communication-ready data bus subscriber being in a sequence of communication-ready data bus subscribers; and
    a mapper to map the received address to a relative position of the communication-ready data bus subscriber in the sequence of communication-ready data bus subscribers in the local bus,
    wherein said sending the at least one data packet is conducted before said receiving the at least one data packet.

15. The local bus master according to claim 14, wherein the transmitter is configured so as to send another data packet to all data bus subscribers in order to count the communication-ready data bus subscribers in sequence, wherein this other data packet is sent for counting before the at least one data packet is sent for querying the address, and wherein the other data packet has another counter value that is changed in sequence by each communication-ready data bus subscriber.

16. The local bus master according to claim 14, further comprising a status signal input for receiving a status signal, wherein the status signal signals that all data bus subscribers connected to the local bus are communication-ready; and wherein the transmitter for sending the at least one data packet for querying the address and/or the transmitter for sending the other data packet for counting are adapted so as to repeat the sending of the at least one data packet for querying the address and/or the data packet for counting until the status signal at the status signal input signals that all data bus subscribers connected to the local bus are communication-ready.

17. The method according to claim 1, wherein, after receiving the at least one data packed for querying an address of the communication ready data bus subscriber from the local bus master, the communication ready data bus subscriber which is being queried changes the at least one data packet back and sends the at least one data packet back to the local bus master.

18. The method according to claim 1, wherein the communication ready data bus subscriber changes the at least one data packet by writing the address of the communication-ready data bus subscriber.

* * * * *